United States Patent
Le et al.

(10) Patent No.: US 12,061,658 B2
(45) Date of Patent: Aug. 13, 2024

(54) BUSINESS SEARCHING METHODS AND APPARATUSES, ELECTRONIC DEVICES AND STORAGE MEDIA

(71) Applicant: Rajax Network Technology (Shanghai) Co., Ltd., Shanghai (CN)

(72) Inventors: Jianjun Le, Shanghai (CN); Xiuji Ding, Shanghai (CN)

(73) Assignee: RAJAX NETWORK TECHNOLOGY (SHANGHAI) CO., LTD., Shanghai (CN)

( * ) Notice: Subject to any disclaimer, the term of this patent is extended or adjusted under 35 U.S.C. 154(b) by 426 days.

(21) Appl. No.: 17/311,576

(22) PCT Filed: Nov. 26, 2019

(86) PCT No.: PCT/CN2019/120840
§ 371 (c)(1),
(2) Date: Jun. 7, 2021

(87) PCT Pub. No.: WO2020/114273
PCT Pub. Date: Jun. 11, 2020

(65) Prior Publication Data
US 2022/0027427 A1    Jan. 27, 2022

(30) Foreign Application Priority Data
Dec. 8, 2018 (CN) .......................... 201811498594.8

(51) Int. Cl.
*G06F 16/00* (2019.01)
*G06F 16/29* (2019.01)
(Continued)

(52) U.S. Cl.
CPC .......... *G06F 16/9537* (2019.01); *G06F 16/29* (2019.01); *G06F 16/9027* (2019.01)

(58) Field of Classification Search
CPC .. G06F 16/9537; G06F 16/29; G06F 16/9027; G06Q 30/0601; G06Q 30/0282
See application file for complete search history.

(56) References Cited

U.S. PATENT DOCUMENTS 7,287,002 B1 * 10/2007 Asher .................... G06Q 10/08
705/26.8
2008/0133484 A1   6/2008 Yamamoto
2015/0046464 A1 * 2/2015 Raiber ................ G06F 16/2246
707/741

FOREIGN PATENT DOCUMENTS

CN    101459569 A    6/2009
CN    103258007 A    8/2013
(Continued)

OTHER PUBLICATIONS

CN 201811498594.8—First Office Action, mailed Feb. 21, 2020, 18 pages. (with English translation).
(Continued)

*Primary Examiner* — Dinku W Gebresenbet
(74) *Attorney, Agent, or Firm* — Getech Law LLC; Jun Ye

(57) ABSTRACT

A method of searching for a business by constructing an index tree using a geographic location of a user is provided. In some examples, the method includes obtaining the geographic location of the user, and retrieving circumscribed rectangles covering the geographic location with a pre-constructed index tree, where the circumscribed rectangles are a smallest circumscribed rectangles covering delivery areas of businesses (101). Target delivery areas covering the geographic location are determined from the delivery areas corresponding to the circumscribed rectangles(102). Businesses corresponding to the target delivery areas are determined as deliverable businesses corresponding to the geographic location(103). The pre-constructed index tree
(Continued)

includes a first index tree constructed based on location data of lower left vertexes of circumscribed rectangles of delivery areas of the businesses, and a second index tree constructed based on location data of upper right vertexes of the circumscribed rectangles of the delivery areas of the business.

13 Claims, 6 Drawing Sheets

(51) Int. Cl.
　　　*G06F 16/901*　　(2019.01)
　　　*G06F 16/9537*　(2019.01)

(56) References Cited

FOREIGN PATENT DOCUMENTS

| CN | 104268243 | A | * | 1/2015 | ....... G06F 17/30961 |
|---|---|---|---|---|---|
| CN | 104424189 | A | * | 3/2015 | |
| CN | 105338492 | A | | 2/2016 | |
| CN | 106599129 | A | | 4/2017 | |
| CN | 107423373 | A | | 12/2017 | |
| CN | 107562895 | A | | 1/2018 | |
| CN | 107908722 | A | | 4/2018 | |
| CN | 108038118 | A | | 5/2018 | |
| CN | 108090150 | A | | 5/2018 | |
| CN | 108171357 | A | | 6/2018 | |
| CN | 109657022 | A | | 4/2019 | |
| JP | 2010160591 | A | * | 7/2010 | |
| JP | 2014142803 | A | * | 8/2014 | |
| WO | 2017058260 | A1 | | 4/2017 | |

OTHER PUBLICATIONS

PCT/CN2019/120840—International Search Report, mailed Feb. 21, 2020, 4 pages.

Zhang, Yong-yu, et al. "3D Gis Research on the Establishment and the Query Algorithms of the Linear Octree Spatial Index for 3D Gis", Computer Engineering & Science, vol. 31, No. 2, 2009, 4 pages. (with English abstract).

* cited by examiner

BUSINESS SEARCHING METHODS AND APPARATUSES, ELECTRONIC DEVICES AND STORAGE MEDIA

CROSS-REFERENCE TO RELATED APPLICATIONS

The present application is a US national phase of a PCT application under PCT/CN2019/120840 which is filed on Nov. 26, 2019, and claims priority to Chinese Patent Application No. 201811498594.8, entitled "BUSINESS SEARCHING METHOD AND APPARATUS, ELECTRONIC DEVICE AND STORAGE MEDIUM", filed Dec. 8, 2018, the entire contents of which are incorporated herein by reference.

TECHNICAL FIELD

The present application relates to a field of E-commerce technology, and more particularly, to methods and apparatuses for searching for a business, electronic devices and storage media.

BACKGROUND

With the development of the Internet, online shopping has become more and more popular. In industries such as catering and hotels, users can quickly place orders via the Internet. For example, in the food delivery industry, when a user places an order, the user first locates his/her own location, and then selects a business to place an order according to a demand on food to be ordered. This process includes a process of searching for spatial locations using location-based service (LBS), that is, retrieving a list of nearby businesses that can provide delivery services to the user based on the geographic location of the user that the user positioned.

For the current solution of spatial search using LBS, one of the related technologies is to utilize a spatial query function of a relational database management system (PostgreSQL). When searching for a business by using this solution, a method of comparing delivery areas of all businesses one by one with the location of the user is used. This method is suitable for a situation where the number of delivery areas of businesses is small. When faced with a situation of tens of thousands of delivery areas of businesses, this solution is unacceptable. Another one of the related technologies is to carry out spatial query by utilizing the search engine Lucene. Delivery areas are divided into several grids, after that, indexing and querying are performed using the relationship between the grids and the geographic location of the user. This solution shows an improved performance, however, this solution increases an amount of spatial data. When the spatial data reaches a level of one million or ten million, the index is too large and will cause errors in the query results.

SUMMARY

An objective of the embodiments of the present application is to provide a method, an apparatus for searching for a business, an electronic device, and a storage medium, which adopt a spatial location search solution based on an index tree and an idea of circumscribed rectangle filtering to aggregate businesses that are close to each other. When searching for a business, a user can quickly find a business that satisfies the search condition.

In order to solve a technical problem, embodiments of the present application provide a method of searching for a business, including: obtaining a geographic location of a user, and retrieving one or more circumscribed rectangles covering the geographic location with a pre-constructed index tree, where each of the one or more circumscribed rectangles is a smallest circumscribed rectangle covering a delivery area of a business; determining one or a plurality of target delivery areas covering the geographic location from one or more delivery areas corresponding to the one or more circumscribed rectangles; determining one or a plurality of businesses corresponding to the one or the plurality of target delivery areas as one or a plurality of deliverable businesses corresponding to the geographic location; where the index tree includes a first index tree constructed based on location data of lower left vertexes of circumscribed rectangles of delivery areas of one or more businesses and a second index tree constructed based on location data of upper right vertexes of the circumscribed rectangles of the delivery areas of the one or more businesses.

Embodiments of the present application also provide an apparatus for searching for a business, including: a searching module configured to obtain a geographic location of a user, and retrieve one or more circumscribed rectangles covering the geographic location with a pre-constructed index tree, where each of the one or more circumscribed rectangles is a smallest circumscribed rectangle covering a delivery area of a business; a target delivery area determining module configured to determine one or a plurality of target delivery areas covering the geographic location from one or more delivery areas corresponding to the one or more circumscribed rectangles; a deliverable business determining module configured to determine one or a plurality of businesses corresponding to the one or the plurality of target delivery areas as one or a plurality of deliverable businesses corresponding to the geographic location, where the pre-constructed index tree includes a first index tree constructed based on location data of lower left vertexes of circumscribed rectangles of delivery areas of the one or more businesses and a second index tree constructed based on location data of upper right vertexes of the circumscribed rectangles of the delivery areas of the one or more businesses.

Embodiments of the present application also provide an electronic device, including: at least one processor; and a memory communicatively connected with the at least one processor, where the memory stores instructions executable by the at least one processor, and the instructions are executed by the at least one processor to implement: obtaining a geographic location of a user, and retrieving one or more circumscribed rectangles covering the geographic location with a pre-constructed index tree, where each of the one or more circumscribed rectangles is a smallest circumscribed rectangle covering a delivery area of a business; determining one or a plurality of target delivery areas covering the geographic location from one or more delivery areas corresponding to the one or more circumscribed rectangles; determining one or a plurality of businesses corresponding to the one or the plurality of target delivery areas as one or a plurality of deliverable businesses corresponding to the geographic location; where the pre-constructed index tree includes a first index tree constructed based on location data of lower left vertexes of circumscribed rectangles of delivery areas of one or more businesses and a second index tree constructed based on location data of upper right vertexes of the circumscribed rectangles of the delivery areas of the one or more businesses.

Embodiments of the present application also provide a non-volatile storage medium for storing a computer readable program, where the computer readable program is configured to be executed by a computer to perform the method of searching for a business described above.

In addition, the geographic location of the user and the delivery area are represented by latitude and longitude coordinates.

In addition, the each of the one or more circumscribed rectangles is determined by: determining extreme values of longitude and latitude in the delivery area of the business, wherein the extreme values of longitude and latitude comprise the maximum longitude, the minimum longitude, the maximum latitude, and the minimum latitude; and determining the circumscribed rectangle based on the extreme values of latitude and longitude.

In addition, before retrieving the one or more circumscribed rectangles covering the geographic location with the pre-constructed index tree, determining a business district to which the user belongs based on the geographic location and the index tree corresponding to the business district.

In addition, wherein obtaining the geographic location of the user, and retrieving the one or more circumscribed rectangles covering the geographic location of the user with the pre-constructed index tree includes: searching for a set of lower left vertexes each having a longitude value less than the longitude value of the geographic location of the user and a latitude value less than the latitude value of the geographic location of user with the first index tree, to obtain a first set of circumscribed rectangles; searching for a set of upper right vertexes each having a longitude value greater than the longitude value of the geographic location of the user and a latitude value less than the latitude value of the geographic location of the user with the second index tree, to obtain a second set of circumscribed rectangles; and determining an intersection of the first set and the second set to obtain the one or circumscribed rectangles covering the geographic location of the user.

In addition, when there are at least two circumscribed rectangles covering the geographic location, determining the one or the plurality of target delivery areas covering the geographic location from the one or more delivery areas corresponding to the one or more circumscribed rectangles includes: adopting a parallel calculation method to determine whether the geographic location of the user is covered by a delivery area corresponding to each of the one or more circumscribed rectangles covering the geographic location of the user; and for each circumscribed rectangle covering the geographic location of the user, in response to determining that the geographic location of the user is covered by the delivery area corresponding to the circumscribed rectangle covering the geographic location of the user, determining the delivery areas corresponding to the circumscribed rectangle as a target delivery area.

In addition, after determining the one or the plurality of businesses corresponding to the one or the plurality of target delivery areas as the one or the plurality of deliverable businesses corresponding to the geographic location, the method further includes: sending information on the one or the plurality of deliverable businesses to a terminal device of the user, and displaying, by the terminal device, the information on the one or the plurality of deliverable businesses.

In addition, dividing points of the first index tree or the second index tree are the vertexes of the one or more circumscribed rectangles.

BRIEF DESCRIPTION OF THE DRAWINGS

FIG. 4($b$) is a schematic diagram of a relationship between a first index tree and a geographic location of a user according to the second embodiment of the present application;

FIG. 5($b$) is a schematic diagram of a relationship between a second index tree and a geographic location of a user according to the second embodiment of the present application;

DETAILED DESCRIPTION OF THE EMBODIMENTS

In order to make the objectives, technical solutions, and advantages of the embodiments of the present application clearer, in the following the embodiments of the present application will be described in detail with reference to the accompanying drawings. However, a person of ordinary skill in the art can understand that in each embodiment of the present application, many technical details are proposed for the reader to better understand the present application. However, even without these technical details and various changes and modifications based on the following embodiments, the technical solution claimed in the present application can be realized.

The first embodiment of the present application relates to a method of searching for a business. This embodiment can be applied to a terminal side, such as in terminal devices such as mobile phones or tablet computers, and can also be applied to a server on a network side.

In the catering industry, a business district is, for example, a city, a district, and so on. The business district contains a plurality of businesses, and each business has a fixed service delivery area, that is, the business only provides order placement and delivery services for users within its own delivery area. When a user places an order via the Internet, the user will first retrieve a list of businesses corresponding to the delivery areas where the user is located, and then select a business and place the order.

Figure 1:
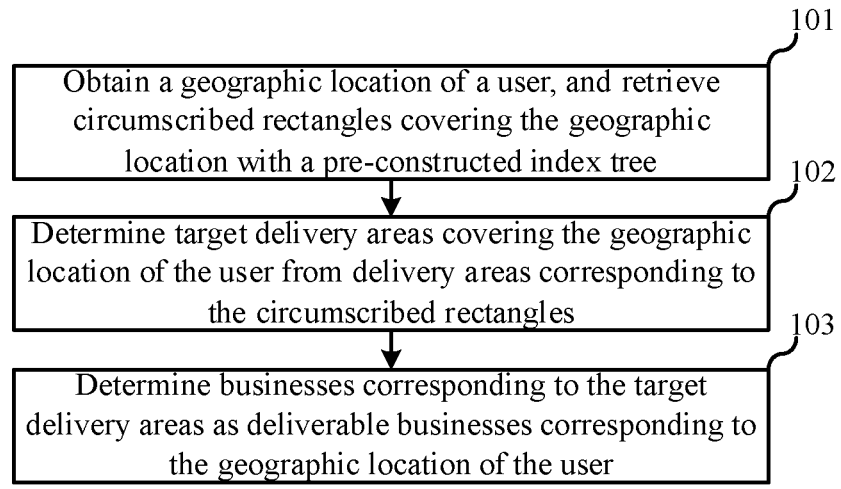
FIG. 1 is a flowchart of a method of searching for a business according to a first embodiment of the present application.

FIG. 1 is a flowchart of a method of searching for a business according to a first embodiment of the present application, and the method includes the following steps.

At S101, a geographic location of a user is obtained, and one or more circumscribed rectangles covering the geographic location of the user are retrieved with a pre-constructed index tree.

In this embodiment, the index tree is a KD index tree, namely k-Dimension tree (K-dimensional spatial index tree), which is a tree-like data structure used for spatial data storage. The KD index tree uses points in the K-dimensional space to divide spatial data, for each division, with a dividing point which has a median value, the data is divided in half. After a plurality of times of divisions and continuous recursion until there is no data on either side of the dividing point. The KD index tree can improve the efficiency of spatial data search by dividing the spatial data in half.

Each of the one or more circumscribed rectangles is the smallest circumscribed rectangle that covers delivery area of one business. The delivery area of a business corresponds to a geographic area, and a shape of the delivery area can be a regular rectangle or an irregular shape.

Figure 2:
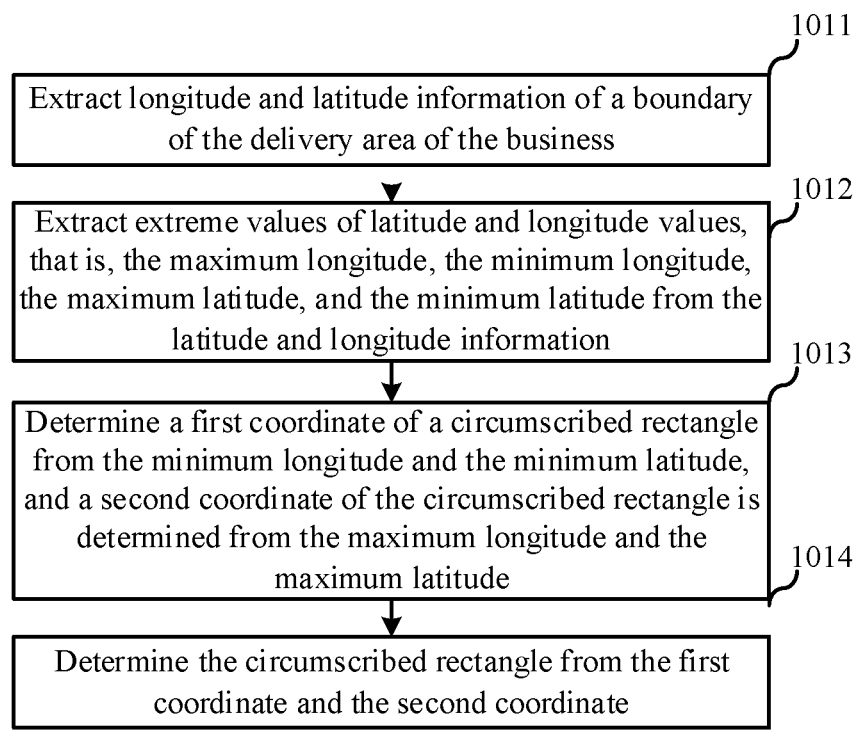
FIG. 2 is a flowchart of determining circumscribed rectangles of one or more delivery areas in a business district according to a first embodiment of the present application.

Further, information of the geographic location of the user and the geographic location of the delivery area of the business is represented by latitude and longitude. A process of determining a circumscribed rectangle of the delivery area of the business according to the first embodiment of the present application is as illustrated by FIG. 2. The circumscribed rectangle is determined based on extreme values of longitude and latitude of the delivery area of the business. The extreme values of longitude and latitude include the maximum longitude, the minimum longitude, the maximum latitude and the minimum latitude. Determining the circumscribed rectangle of the delivery area includes the following steps.

At S1011, longitude and latitude information of a boundary of the delivery area of the business is extracted.

The longitude and latitude information includes longitude and latitude values of all points on the boundary of the delivery area of the business.

At S1012, extreme values of latitude and longitude values, that is, the maximum longitude, the minimum longitude, the maximum latitude, and the minimum latitude, are extracted from the latitude and longitude information.

Among all the extracted longitude values on the boundary of the delivery area, the maximum longitude and the minimum longitude are searched out; and among all the extracted latitude values on the boundary of the delivery area, the maximum latitude and the minimum latitude are searched out. The maximum longitude and the minimum longitude are represented as, for example, Wmax and Wmin, respectively, and the maximum latitude and the minimum latitude are represented as, for example, Nmax and Nmin, respectively.

At S1013, a lower left vertex of the circumscribed rectangle is determined from the minimum longitude and the minimum latitude, and an upper right vertex of the circumscribed rectangle is determined from the maximum longitude and the maximum latitude.

For example, a coordinate of the lower left vertex of the circumscribed rectangle determined from the minimum longitude Wmin and the minimum latitude is pa (Wmin, Nmin), and a coordinate of the upper right vertex of the circumscribed rectangle determined from the maximum longitude Wmax and the maximum latitude Nmax is pb (Wmax, Nmax).

At S1014, the circumscribed rectangle is determined from the lower left vertex and the upper right vertex.

Figure 3:
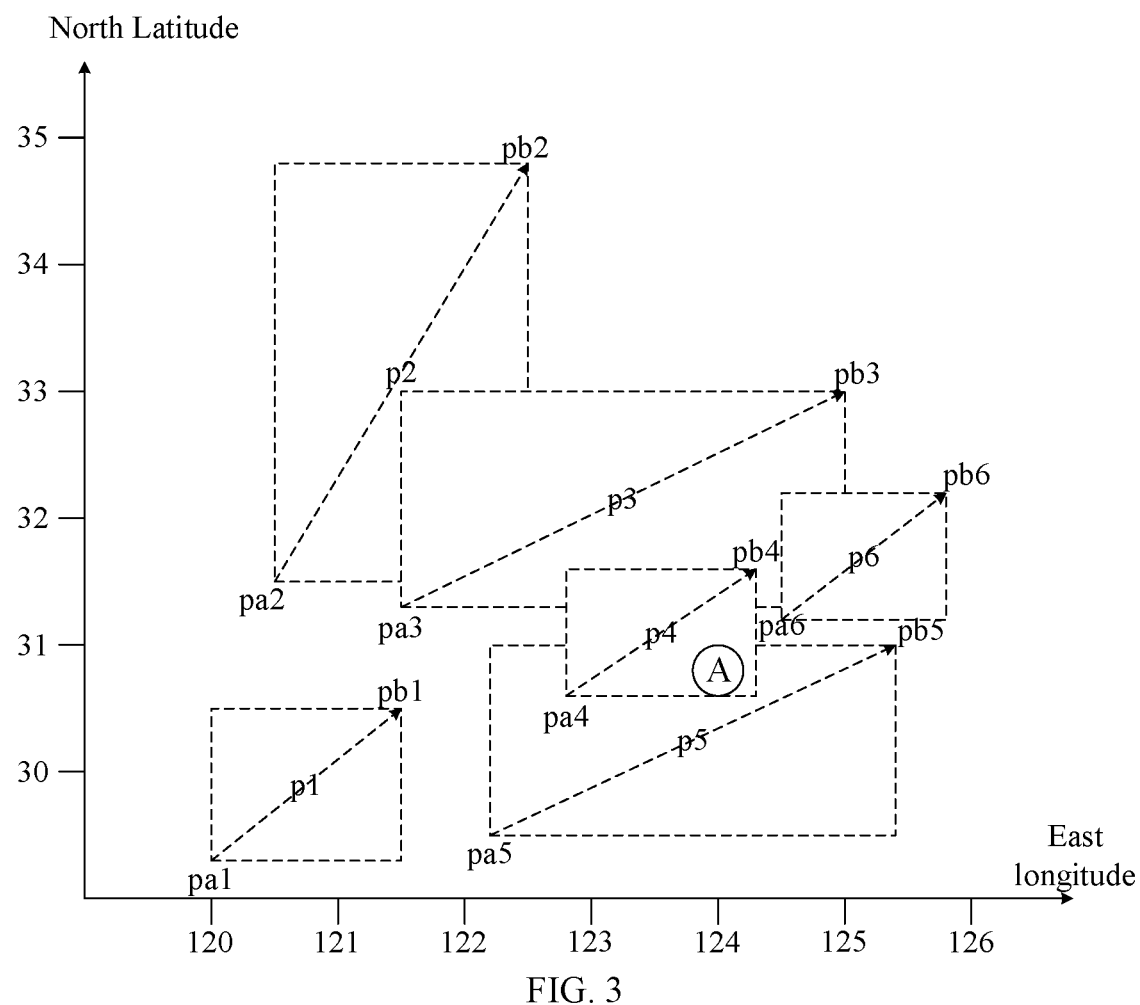
FIG. 3 is a schematic diagram of circumscribed rectangles of one or more delivery areas in a business district according to the first embodiment of the present application.

In this embodiment, a connection line between the lower left vertex pa (Wmin, Nmin) and the upper right vertex pb (Wmax, Nmax) is taken as a diagonal of the circumscribed rectangle to determine the circumscribed rectangle corresponding to the delivery area. Through the above steps S1011-S1014, the determined circumscribed rectangles of the delivery areas of all businesses in a business district are as shown in FIG. 3. For example, there are 6 businesses, and the corresponding circumscribed rectangles of their delivery areas are p1, p2, p3, p4, p5, and p6, respectively.

In this embodiment, one or more KD index trees are constructed for each business district, that is, for a number of businesses included in each business district and the delivery areas of the businesses, one or more KD index trees corresponding to the business district are constructed. Further, the one or more KD index trees are constructed in advance based on the circumscribed rectangles of the delivery areas of the businesses in the business district. The one or more pre-constructed KD index trees include a first KD index tree constructed based on location data of the lower left vertexes of the one or more circumscribed rectangles and a second KD index tree constructed based on location data of the upper right vertexes of the one or more circumscribed rectangles. A first-level dividing line of the first KD index tree or the second KD index tree can be a longitudinal dividing line, such as a latitude line, or a horizontal dividing line, such as a latitude line. Dividing points of dividing lines of each level of the first KD index tree and the second KD index tree can be vertexes of the one or more circumscribed rectangles, or coordinate points that do not belong to the vertexes of the one or more circumscribed rectangles.

In this embodiment, when one or more businesses that match the geographic location of the user are to be determined, the business district to which the user belongs and the index tree corresponding to the business district such as the first KD index tree and the second KD index tree, are determined based on the geographic location of the user. Then, the first KD index tree and the second KD index tree are used for searching, and one or more circumscribed rectangles covering the geographic location of the user can be obtained.

At S102, one or a plurality of target delivery areas covering the geographic location of the user are determined from one or more delivery areas corresponding to the one or more circumscribed rectangles.

In this embodiment, based on the one or more circumscribed rectangles covering the geographic location of the user as searched out at step S101, one or more corresponding businesses can be obtained. Because a geographic area covered by a circumscribed rectangle of a delivery area of a business may be different from a geographic area covered by the delivery area of the business, the circumscribed rectangle of the delivery area of the business covering the geographic location of the user does not mean that the geographic area covered by the delivery area of the business also covers the geographic location of the user. Therefore, further, comparing the longitude and latitude information of the geographic location of the user with the coverage of the delivery areas corresponding to the one or more circumscribed rectangles covering the geographic location of the user, it can be determined whether the geographic location of the user is within the coverage of the delivery areas corresponding to the one or more circumscribed rectangles, so as to determine the one or the plurality of target delivery areas covering the geographic location of the user.

If the longitude and latitude information of the geographic location of the user is within the coverage of the delivery areas corresponding to the one or more circumscribed rectangles, it means that the one or more businesses corresponding to the one or more circumscribed rectangles can provide a delivery service for the user, and the one or more delivery areas corresponding to the one or more circumscribed rectangles are determined to be the one or the plurality of target delivery areas.

If the longitude and latitude information of the geographic location of the user is not within the coverage of the delivery areas corresponding to the one or more circumscribed rectangles, it means that the one or more businesses corresponding to the one or more circumscribed rectangles cannot provide a delivery service for the user.

Further, when there are a plurality of circumscribed rectangles covering the geographic location of the user, at this step, when determining whether the delivery areas of the plurality of businesses cover the geographic location of the user, a serial calculation method can be performed for the plurality of delivery areas in sequence, or a parallel calculation method can be performed for the plurality of delivery areas at the same time. The serial calculation method refers to calculating the delivery areas of the plurality of businesses one by one and determining whether the delivery area of each business covers the geographic location of the user; the parallel calculation method refers to simultaneously calculating the delivery areas of the plurality of businesses and determining whether the delivery area of each business covers the geographic location of the user.

At S103, one or a plurality of businesses corresponding to the one or the plurality of target delivery areas are determined as one or a plurality of deliverable businesses corresponding to the geographic location of the user.

In this embodiment, the one or the plurality of target delivery areas cover the geographic location of the user, that is, the one or the plurality of businesses corresponding to the one or the plurality of target delivery areas can provide a delivery service for the user, and the one or the plurality of business are determined as the one or the plurality of deliverable businesses for the user, or, the one or the plurality of deliverable businesses corresponding to the geographic location of the user.

In this embodiment, after the one or the plurality of deliverable businesses corresponding to the geographic location of the user are determined, information of the one or the plurality of deliverable businesses is sent to a terminal device of the user, and the information of the one or the plurality of deliverable businesses is displayed on the terminal device. For example, sending a list of deliverable businesses to the user's mobile phone, and displaying information of the businesses in the list of deliverable businesses on the screen of the mobile terminal such as the mobile phone. The display content can include an ID of the business, a name of the business, a distance from the business to the user, a delivery fee, an initial delivery price and so on.

In this embodiment, the business, the delivery area of the business, and the circumscribed rectangle of the delivery area are associated by a feature parameter of the business, and the feature parameter of the business is, for example, an ID of the business.

In the embodiments of the present application, a spatial location search solution based on an index tree is adopted, and two index trees are constructed from lower left vertexes and upper right vertexes of circumscribed rectangles of the businesses respectively. When a user searches for one or more businesses, an amount of data for the search only involves data of the two vertexes of each delivery area, which can greatly reduce an amount of calculations and can quickly find businesses that satisfy search condition. In addition, by determining the circumscribed rectangle according to the maximum latitude and longitude and the minimum latitude and longitude on the boundary of the delivery area, the minimum circumscribed rectangle including the delivery area of the business can be obtained, which can reduce the amount of calculation in the search process.

A second embodiment of the present application relates to a method of searching for a business. This embodiment can be applied to terminal side, such as in a terminal device such as a mobile phone or a tablet computer, and can also be applied to a server on network side. The method of searching for a business in the embodiment of the present application includes the following steps.

At S101, a geographic location of a user is obtained, and one or more circumscribed rectangles covering the geographic location of the user are retrieved with a pre-constructed index tree.

In this embodiment, each of the one or more circumscribed rectangles is the smallest circumscribed rectangle that covers a delivery area of a business. The method of determining the circumscribed rectangle is described in the steps S1011-1014 in the first embodiment. As shown in FIG. 3, for example, there are six businesses in the business district, and the circumscribed rectangles corresponding to their delivery areas are p1, p2, p3, p4, p5, and p6 in which p1 has a lower left vertex pa1, an upper right vertex pb1, and a diagonal pa1-pb1; p2 has a lower left vertex pa2, an upper right vertex pb2, and a diagonal pa2-pb2; p3 has a lower left vertex pa3, an upper right vertex pb3, and a diagonal pa3-pb3; p4 has a lower left vertex pa4, an upper right vertex pb4, and a diagonal pa4-pb4; p5 has a lower left vertex pa5, an upper right vertex pb5, and a diagonal pa5-pb5; and p6 has a lower left vertex pa6, an upper right vertex pb6, and a diagonal pa6-pb6. A geographic location of a user A is located in the circumscribed rectangle p4 and the circumscribed rectangle p5 at the same time.

In this embodiment, KD index trees are constructed for each business district, that is, for a number of businesses included in each business district and the delivery areas of the businesses, the KD index trees corresponding to the business district are constructed. Further, the KD index trees are constructed in advance based on the circumscribed rectangles of the delivery areas of the businesses in the business district. The pre-constructed KD index trees include a first KD index tree constructed based on location data of lower left vertexes of one or more circumscribed rectangles and a second KD index tree constructed based on location data of upper right vertexes of the one or more circumscribed rectangles. A first-level dividing line of the first KD index tree or the second KD index tree can be a longitudinal dividing line, such as a latitude line, or a horizontal dividing line, such as a latitude line. Dividing points of dividing lines of each level of the first KD index tree and the second KD index tree can be vertexes of the one or more circumscribed rectangles, or coordinate points that do not belong to vertexes of the one or more circumscribed rectangles. For example, when a number of vertexes to be divided in a certain level is an odd number, a vertex with an intermediate geographic location among the vertexes to be divided is selected as the dividing point; when the number of vertexes to be divided in a certain level is an even number, among the vertexes to be split, one of the two vertexes located in the middle position is selected as the dividing point, or a certain coordinate point between the two vertexes is selected as the dividing point.

In an embodiment of the present application, as shown in FIG. 3, there are a total of six businesses in the business district, and the circumscribed rectangles corresponding to their delivery areas are p1, p2, p3, p4, p5, and p6. The latitude and longitude coordinates of the lower left vertexes of the six circumscribed rectangles are pa1 (120, 29.3), pa2 (120.5, 31.5), pa3 (121.5, 31.3), pa4 (122.8, 30.6), pa5 (122.2, 29.5), and pa6 (124.5, 31.2); the latitude and longitude coordinates of the upper right vertexes of the six circumscribed rectangles are pb1 (121.5, 30.5), pb2 (122.5, 34.8), pb3 (125, 33), pb4 (124.3, 31.6), pb5 (125.4, 31), and pb6 (125.8, 32.2). Steps for constructing the first KD index tree and the second KD index tree based on the lower left vertexes and the upper right vertexes of the above six circumscribed rectangles are as follows.

At S1015, the first KD index tree is constructed based on the lower left vertexes of the circumscribed rectangles.

Figure 4A:
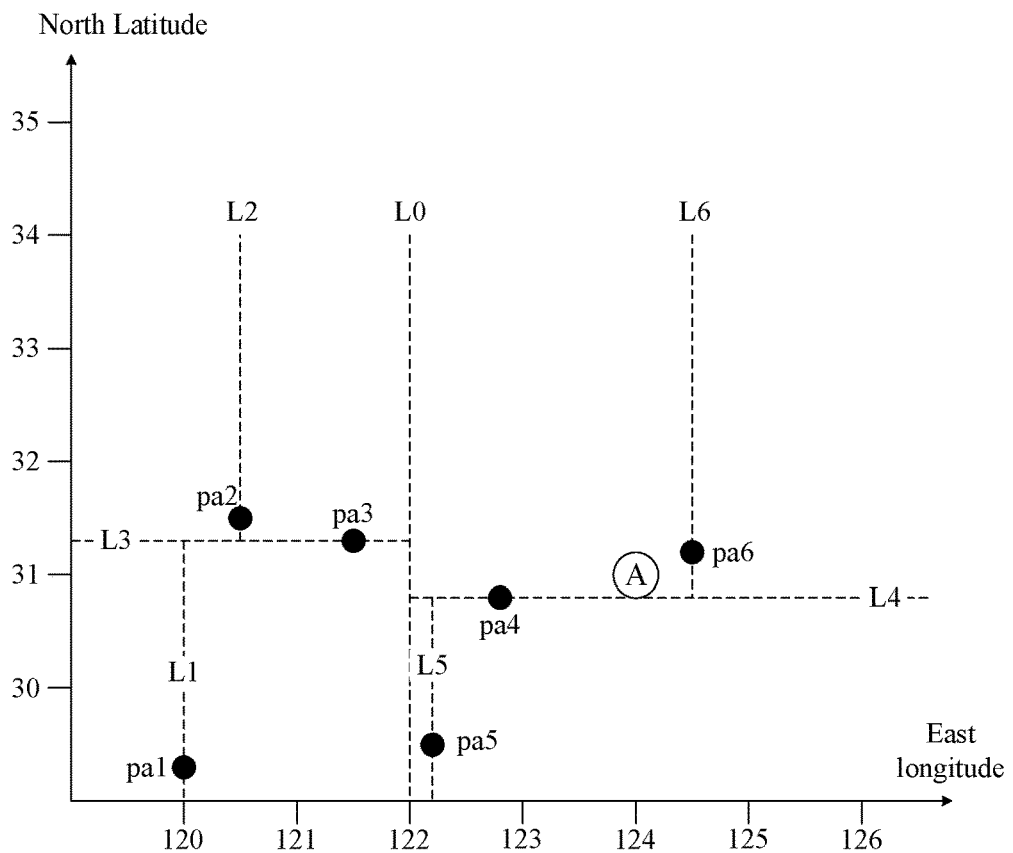
FIG. 4($a$) is a schematic diagram of constructing a first index tree according to a second embodiment of the present application.
Figure 4B:
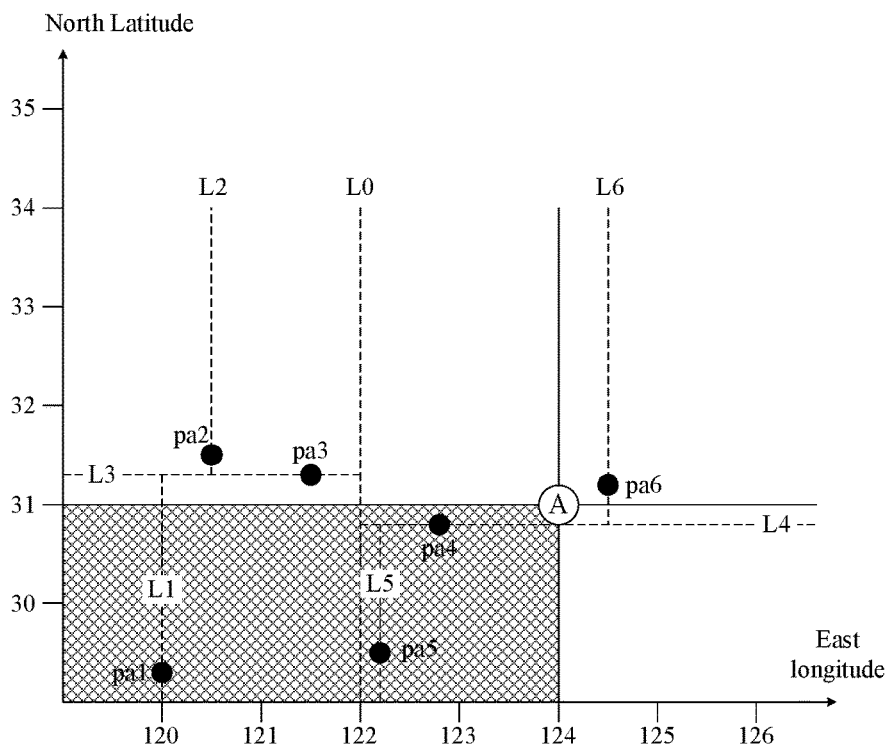

Further, FIG. 4(a) is a schematic diagram of constructing the first KD index tree according to the second embodiment of the present application, and FIG. 4(b) is a schematic diagram of a relationship between the first KD index tree and a geographic location of the user according to the second embodiment of the present application. As shown in FIG. 4(a), the process of constructing the first KD index tree is as follows.

(1) A longitude line L0 is selected as a dividing line of a first level of the first KD index tree.

A longitude value corresponding to the dividing line L0 is 122. L0 divides six lower left vertexes into two parts, the first part contains three lower left vertexes pa1, pa2 and pa3, and the second part contains three lower left vertexes pa4, pa5 and pa6.

(2) A latitude line L3 and a latitude line L4 are selected as dividing lines of a second level of the first KD index tree.

The dividing line L3 passes through the lower left vertex pa3 (121.5, 31.3), that is, the corresponding latitude value is 31.3. L3 divides the three lower left vertexes pa1, pa2 and pa3 into two parts, and the lower left vertex located on the dividing line L3, namely pa3 (121.5, 31.3), is set as belonging to both the first part and the second part. Therefore, the first part contains two lower left vertexes pa1 and pa3, and the second part contains two lower left vertexes pa2 and pa3.

The dividing line L4 passes through the lower left vertex pa4 (122.8, 30.6), that is, the corresponding latitude value is 30.6. L4 divides the three lower left vertexes pa4, pa5 and pa6 into two parts, where the lower left vertex pa4 belongs to both the first part and the second part. Therefore, the first part contains two lower left vertexes pa4 and pa5, and the second part contains two lower left vertexes pa4 and pa6.

(3) Longitude lines L1, L2, L5, and L6 are selected as dividing lines of a third level of the first KD index tree.

The dividing line L1 passes through the lower left vertex pa1 (120, 29.3), that is, the corresponding longitude value is 120. L1 divides the two lower left vertexes pa1 and pa3 into two parts, where the lower left vertex pa1 belongs to both the first part and the second part. Therefore, the first part contains one lower left vertex pa1, and the second part contains two lower left vertexes pa1 and pa3.

The dividing line L2 passes through the lower left vertex pa2 (120.5, 31.5), that is, the corresponding longitude value is 120.5. L2 divides the two lower left vertexes pa2 and pa3 into two parts, where the lower left vertex pa2 belongs to both the first part and the second part. Therefore, the first part contains one lower left vertex pa2, and the second part contains two lower left vertexes pa2 and pa3.

The dividing line L5 passes through the lower left vertex pa5 (122.2, 29.5), that is, the corresponding longitude value is 122.2. L5 divides the two lower left vertexes pa4 and pa5 into two parts, where the lower left vertex pa5 belongs to both the first part and the second part. Therefore, the first part contains one lower left vertex pa5, and the second part contains two lower left vertex pa4 and pa5.

The dividing line L6 passes through the lower left vertex pa6 (124.5, 31.2), that is, the corresponding longitude value is 124.5. L6 divides the two lower left vertexes pa4 and pa6 into two parts, where the lower left vertex pa6 belongs to both the first part and the second part. Therefore, the first part contains one lower left vertex pa6, and the second part contains two lower left vertexes pa4 and pa6.

At this time, all the lower left vertexes are located on the dividing lines of each level as dividing points, that is, there is no lower left vertex data on both sides of each dividing line of the third level, and the construction of the first KD index tree is completed. When the first KD index tree is used to find the one or more circumscribed rectangles covering the geographic location of the user, as shown in FIG. 4(b), the longitude and latitude coordinate of the user A are A(124, 31). The lower left vertex of the one or more circumscribed rectangles covering the location of the user A should be located in a hatched area as shown in FIG. 4(b).

At S1016, a second KD index tree is constructed based on the upper right vertexes of the circumscribed rectangles.

Figure 5A:
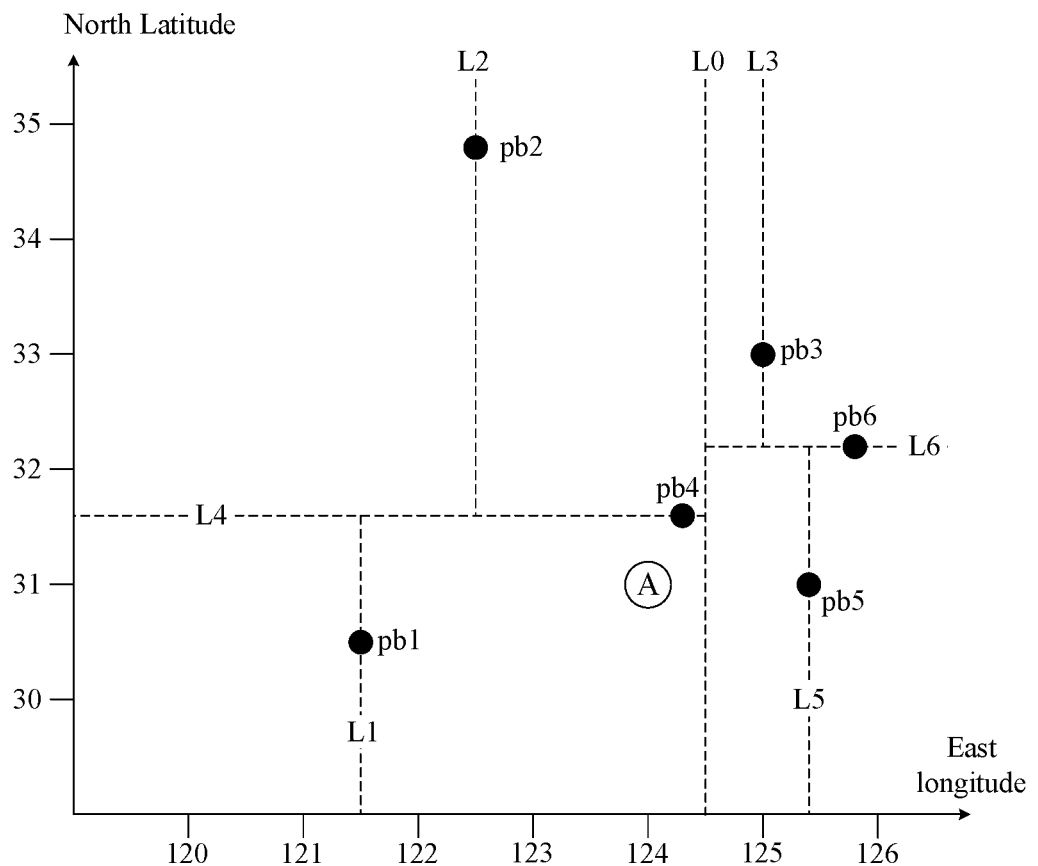
FIG. 5($a$) is a schematic diagram of constructing a second index tree according to the second embodiment of the present application.
Figure 5B:
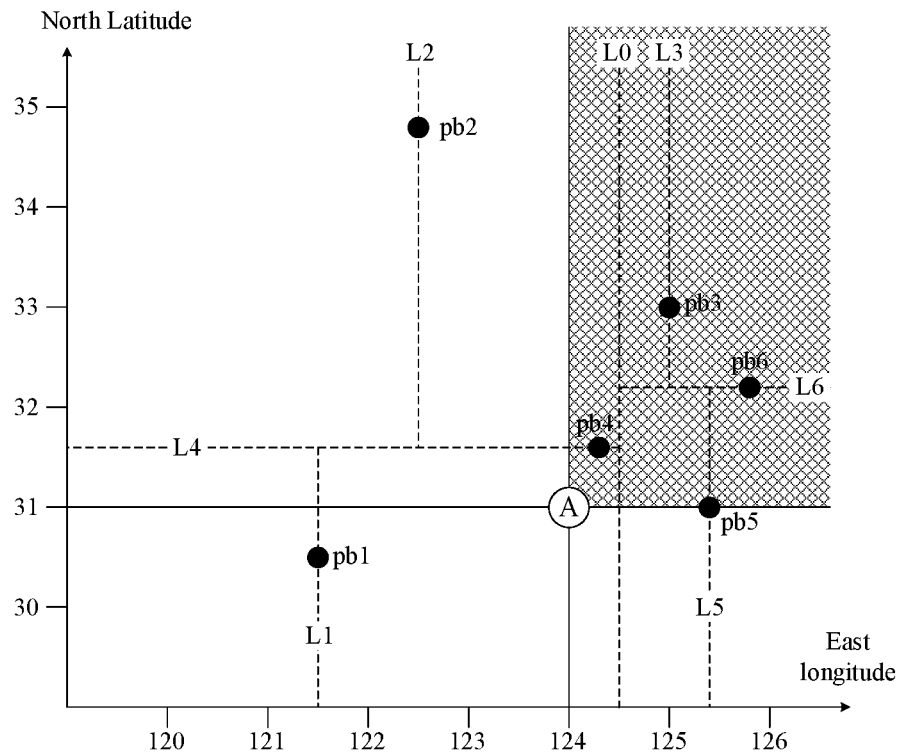

Further, FIG. 5(a) is a schematic diagram of constructing a second index tree according to the second embodiment of the present application; and FIG. 5(b) is a schematic diagram of a relationship between the second index tree and the geographic location of the user according to the second embodiment of the present application. As shown in FIG. 5(b), the process of constructing the second KD index tree is as follows.

(1) Longitude line L0 is selected as a dividing line of a first level of the second KD index tree.

A longitude value corresponding to the dividing line L0 is 124.5. L0 divides six upper right vertexes into two parts, the first part contains three upper right vertexes pb1, pb2 and pb4, and the second part contains three upper right vertexes pb3, pb5 and pb6.

(2) Latitude line L4 and latitude line L6 are selected as dividing lines of a second level of the second KD index tree.

The dividing line L4 passes through the upper right vertex pb4 (124.3, 31.6), that is, the corresponding latitude value is 31.6. L4 divides the three upper right vertexes pb1, pb2 and pb4 into two parts, and the upper right vertex located on the dividing line L4, that is, the upper right vertex corresponding to pb4 (124.3, 31.6), is set as belonging to both the first part and the second part. Therefore, the first part contains two upper right vertexes pb1 and pb4, and the second part contains two upper right vertexes pb2 and pb4.

The dividing line L6 passes through the upper right vertex pb6 (125.8, 32.2), that is, the corresponding latitude value is 32.2. L6 divides the three upper right vertexes pb3, pb5, and pb6 into two parts, where the upper right vertex pb6 belongs to both the first part and the second part. Therefore, the first part contains two upper right vertexes pb3 and pb6, and the second part contains two upper right vertexes pb5 and pb6.

(3) Longitude lines L1, L2, L3, and L5 are selected as dividing lines of a third level of the second KD index tree.

The dividing line L1 passes through the upper right vertex pb1 (121.5, 30.5), that is, the corresponding longitude value is 121.5. L1 divides the two upper right vertexes pb1 and pb4 into two parts, where the upper right vertex pb1 belongs to both the first part and the second part. Therefore, the first part contains one upper right vertex pb1, and the second part contains two upper right vertexes pb1 and pb4.

The dividing line L2 passes through the upper right vertex pb2 (122.5, 34.8), that is, the corresponding longitude value is 122.5. L2 divides the two upper right vertexes pb2 and pb4 into two parts, where the upper right vertex pb2 belongs to both the first part and the second part. Therefore, the first part contains one upper right vertex pb2, and the second part contains two upper right vertexes pb2 and pb4.

The dividing line L3 passes through the upper right vertex pb3 (125, 33), that is, the corresponding longitude value is 125. L3 divides the two upper right vertexes pb3 and pb6 into two parts, where the upper right vertex pb3 belongs to both the first part and the second part. Therefore, the first part contains one upper right vertex pb3, and the second part contains two upper right vertexes pb3 and pb6.

The dividing line L5 passes through the upper right vertex pb5 (125.4, 31), that is, the corresponding longitude value is 125.4. L5 divides the two upper right vertexes pb5 and pb6 into two parts, where the upper right vertex pb5 belongs to both the first part and the second part. Therefore, the first part contains one upper right vertex pb5, and the second part contains two upper right vertexes pb5 and pb6.

At this time, all the upper right vertexes are located on the dividing lines of each level as dividing points, that is, there is no upper right vertex data on both sides of each dividing line of the third level, and the construction of the second KD index tree is completed. When the second KD index tree is used to find the one or more circumscribed rectangles covering the geographic location of the user, as shown in FIG. 5(b), the longitude and latitude coordinate corresponding to the location of the user A is A(124, 31) and the upper right vertexes of the one or more circumscribed rectangles covering the location of the user A should be in a hatched area as shown in FIG. 5(b).

Figure 6A:
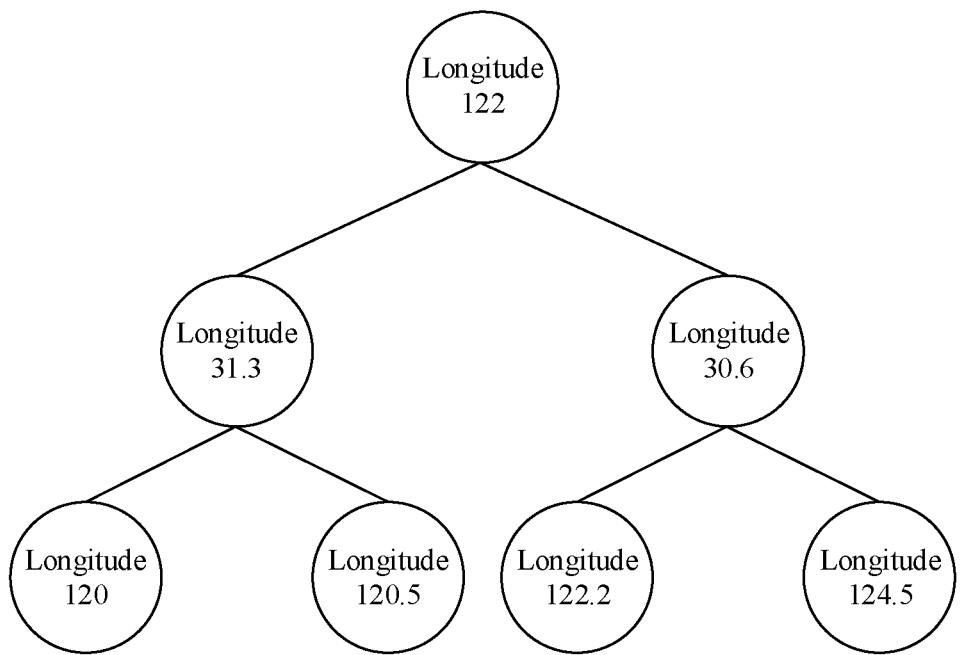
FIG. 6($a$) and FIG. 6($b$) are schematic diagrams of the first index tree and the second index tree according to the second embodiment of the present application.
Figure 6B:
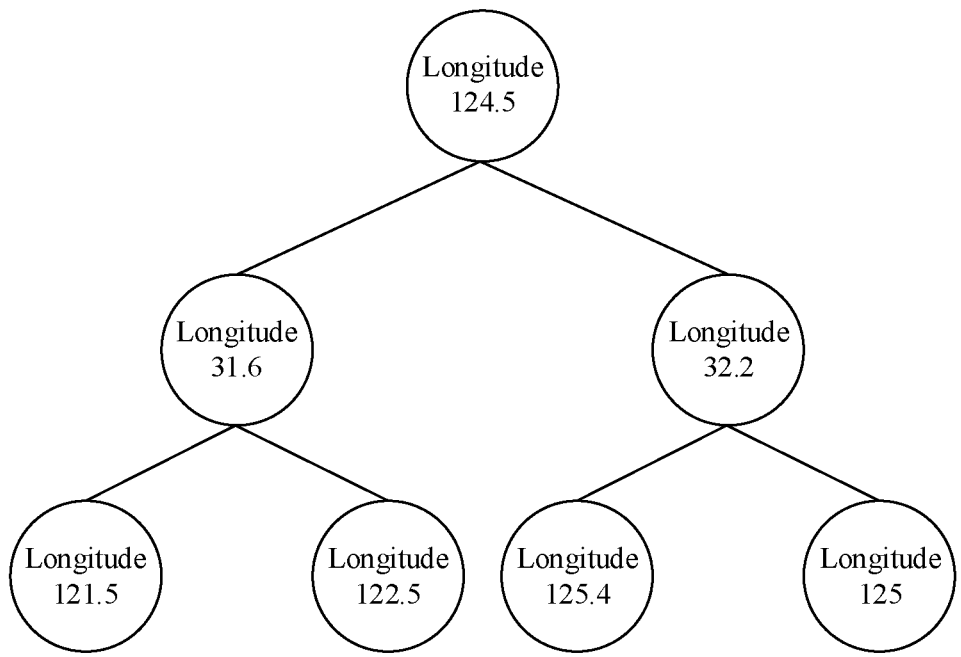

In short, the constructions of the first KD index tree and the second KD index tree are completed. FIG. 6(a) and FIG. 6(b) are schematic diagrams of the first KD index tree and the second KD index tree according to the second embodiment of the present application.

In this embodiment, when one or a plurality of businesses that match a geographic location of the user are to be determined, a business district to which the user belongs and an index tree corresponding to the business district, such as the first KD index tree and the second KD index tree, are firstly determined based on the geographic location of the user. Then, the first KD index tree and the second KD index tree are used for retrieving one or more circumscribed rectangles covering the geographic location of the user. The search process includes the following steps.

At S1017, a set of lower left vertexes each having a longitude value less than the longitude value of the geographic location of the user and a latitude value less than the latitude value of the geographic location of the user is determined with the first KD index tree, to obtain a first set of circumscribed rectangles.

Referring to FIG. 4(b) and FIG. 6(a) together, longitude and latitude coordinate of user A is A (124, 31), that is, the longitude is 124 and the latitude is 31. According to FIG. 4(b), the one or more circumscribed rectangles covering the location of user A should satisfy the condition that: the lower left vertex is located in the hatched area in FIG. 4(b), that is, a longitude value of a lower left vertex is less than or equal to 124, and a latitude value of the lower left vertex is less than or equal to 31. It can be seen from FIG. 4(b) that lower left vertexes of one or more qualified circumscribed rectangles include: pa3 (121.5, 31.3), pa4 (122.8, 30.6) and pa5 (122.2, 29.5). To find pa3, pa4 and pa5, the first KD index tree shown in FIG. 6(a) is used for search, starting from root node and traversing down level by level. The first search condition is: the longitude value of the lower left vertex being less than or equal to 124, and the latitude value of the lower left vertex being less than or equal to 31. The following steps are below.

(1) A first level of the first KD index tree is searched from.

The root node has a longitude value 122, and longitude values of one or more lower left vertexes in a set on the left side of the root node are less than or equal to 122, which satisfy the longitude condition of the first search condition. The longitude condition is that the longitude value is less than or equal to 124. The longitude values of the one or more lower left vertexes in a set on the right side of the root node are greater than or equal to 122, which have an intersection with the longitude condition. That is, the next step is to continue searching in the sets on the left and right sides of the root node respectively.

(2) A second level of the first KD index tree is searched from.

Two child nodes to be searched are latitude 31.3 and latitude 30.6 respectively. For the child node of latitude 31.3, the latitude values of the one or more lower left vertexes in a set on the left side of the child node of latitude 31.3 are less than or equal to 31.3, which have an intersection with the latitude condition of the first search condition, where the latitude condition is that the latitude value is less than or equal to 31. The latitude values of the one or more lower left vertexes in a set on the right side of the child node of latitude 31.3 are greater than or equal to 31.3, which do not satisfy the latitude condition.

For the child node of latitude 30.6, the latitude values of the one or more lower left vertexes in a set on the left side of the child node of latitude 30.6 are less than or equal to 30.6, which satisfy the latitude condition; the latitude values of the one or more lower left vertexes in a set on the right side of the child node of latitude 30.6 are greater than or equal to 30.6, which have an intersection with the latitude condition. At this time, it shows that the lower left vertex on the dividing line inexorably satisfies both the longitude condition and latitude condition of the first search condition. At this step, the lower left vertex that satisfies the first search condition is obtained, which is pa4 (122.8, 30.6).

As described above, the next step is to continue searching from a set on the left side of the child node of latitude 31.3, and sets on the left and right sides of the child node of latitude 30.6, respectively.

(3) A third level of the first KD index tree is searched from.

The third level includes one or more leaf nodes, and three leaf nodes to be searched are three longitude lines of 120 longitude, 122.2 longitude, and 124.5 longitude, respectively. It is determined whether the longitude values of these three longitude lines satisfy the longitude condition of the first search condition. The longitude line 120 satisfies the longitude condition; the longitude line 122.2 satisfies the longitude condition; and the longitude line 124.5 does not satisfy the longitude condition. It is further determined that the lower left vertexes located on the longitude 120 and the longitude 122.2 inexorably satisfies both the longitude condition and the latitude condition of the first search condition. Therefore, at this step, two lower left vertexes that satisfy the first search condition are pa1 (120, 29.3) and pa5 (122.2, 29.5).

Through the above-mentioned steps (1)-(3), three lower left vertexes that satisfy the first search condition are obtained, which are pa1 (120, 29.3), pa4 (122.8, 30.6) and pa5 (122.2, 29.5). Based on the three obtained lower left vertexes, the first set of corresponding circumscribed rectangles is obtained, which is S1={p1, p4, p5}.

At S1018, a set of upper right vertexes each having a longitude value greater than the longitude value of the geographic location of the user and a latitude value less than the latitude value of the geographic location of the user is searched for with the second KD index tree, to obtain a second set of circumscribed rectangles.

Referring to FIG. 5(b) and FIG. 6(b) together, longitude and latitude coordinate of user A is A (124, 31), that is, the longitude is 124 and the latitude is 31. According to FIG. 5(b), the one or more circumscribed rectangles covering the location of user A should satisfy the condition that: one or more upper right vertexes are located in the hatched area in FIG. 5(b), that is, a longitude value of an upper right vertex is greater than or equal to 124, and a latitude value of the upper right vertex is greater than or equal to 31. It can be seen from FIG. 5(b) that upper right vertexes of one or more qualified circumscribed rectangles include: pb3 (125, 33), pb4 (124.3, 31.6), pb5 (125.4, 31) and pb6 (125.8, 32.2). To find pb3, pb4, pb5 and pb6, the second KD index tree shown in FIG. 6(b) is used for search, starting from root node and traversing down level by level. The second search condition is: the longitude value of the upper right vertex being greater than or equal to 124, and the latitude value of the upper right vertex being greater than or equal to 31. The following steps are below.

(1) A first level of the second KD index tree is searched from.

The root node has a longitude value 124.5, and longitude values of one or more upper right vertexes in a set on the left side of the root node are less than or equal to 124.5, which have an intersection with the longitude condition of the second search condition. The longitude condition is that the longitude value is greater than or equal to 124. The longitude values of the one or more upper right vertexes in a set on the right side of the root node are greater than or equal to 124.5, which satisfy the longitude condition. That is, the next step is to continue searching in the sets on the left and right sides of the root node respectively.

(2) A second level of the second KD index tree is searched from.

Two child nodes to be searched are latitude 31.6 and latitude 32.2 respectively. For the child node of latitude 31.6, the latitude values of the one or more upper right vertexes in a set on the left side of the child node of latitude 31.6 are less than or equal to 31.6, which have an intersection with the latitude condition of the second search condition, where the latitude condition is that the latitude value is greater than or equal to 31. The latitude values of the one or more upper right vertexes in a set on the right side of the child node of latitude 31.6 are greater than or equal to 31.3, which satisfy the latitude condition. At this time, it means that the upper right vertex on the dividing line inexorably satisfies both the longitude condition and latitude condition of the second search condition. At this step, the upper right vertex that satisfies the second search condition is pb4 (124.3, 31.6).

For the child node of latitude 32.2, the latitude values of the one or more upper right vertexes in a set on the left side of the child node of latitude 32.2 are less than or equal to 32.2, which have an intersection with the latitude condition; the latitude values of the one or more upper right vertexes in a set on the right side of the child node of latitude 32.2 are greater than or equal to 32.2, which satisfy the latitude condition. At this time, it shows that the upper right vertex on the dividing line inexorably satisfies both the longitude condition and latitude condition of the second search condition. At this step, the upper right vertex that satisfies the second search condition is obtained, which is pb6 (125.8, 32.2).

As above described, the next step is to continue searching from sets on the left and right sides of the child node of latitude 31.6 and sets on the left and right sides of the child node of latitude 32.2, respectively.

(3) A third level of the second KD index tree is searched from.

The third level includes one or more leaf nodes, and four leaf nodes to be searched are four longitude lines of 121.5 longitude, 122.5 longitude, 125.4 longitude, and 125 longitude, respectively. It is determined whether the longitude values of these four longitude lines satisfy the longitude condition of the second search condition. The longitude line 121.5 does not satisfy the longitude condition; the longitude line 122.5 does not satisfy the longitude condition; the longitude line 125.4 satisfies the longitude condition; and longitude line 125 satisfies the longitude condition. It is further determined that the upper right vertexes located on the longitude 125.4 and the longitude 125 inexorably satisfy both the longitude condition and the latitude condition of the second search condition. Therefore, at this step, the two upper right vertexes that satisfy the second search condition are obtained, which are pb3 (125, 33) and pb5 (125.4, 31).

Through the above-mentioned steps (1)-(3), four upper right vertexes that satisfy the second search condition are obtained, which are pb3(125, 33), pb4(124.3, 31.6), pb5 (125.4, 31), and pb6(125.8, 32.2). Based on the obtained four upper right vertexes, the second set of corresponding circumscribed rectangles is obtained, which is S2={p3, p4, p5, p6}.

At S1019, an intersection of the first set and the second set is determined to obtain the one or more circumscribed rectangles covering the geographic location of the user.

The intersection of the first set and the second set can be determined from the first set of circumscribed rectangles S1 obtained at step S1017 and the second set of circumscribed rectangles S2 obtained at step S1018, that is:

$$S = S1 \cap S2 = \{p4, p5\}.$$

Therefore, the obtained one or more circumscribed rectangles covering the geographic location of the user include p4 and p5.

At S102, one or a plurality of target delivery areas covering the geographic location of the user are determined from one or more delivery areas corresponding to the one or more circumscribed rectangles.

In this embodiment, the method of determining the one or the plurality of target delivery areas is as step S102 in the first embodiment.

At S103, one or a plurality of businesses corresponding to the one or the plurality of target delivery areas are determined as one or a plurality of deliverable businesses corresponding to the geographic location of the user.

In this embodiment, the one or the plurality of target delivery areas cover the geographic location of the user, that is, the one or the plurality of businesses corresponding to the one or the plurality of target delivery areas can provide a delivery service for the user, and the one or the plurality of businesses are determined as the one or the plurality of deliverable businesses for the user, that is, the one or the plurality of deliverable businesses corresponding to the geographic location of the user.

In the embodiment of the present application, a spatial location search solution based on an index tree is adopted, and two index trees are constructed based on lower left vertexes and upper right vertexes of circumscribed rectangles of one or more businesses. When a user searches for one or more businesses, only data of the two vertexes of each delivery area is involved in the amount of data for the search, which can greatly reduce the amount of calculations and can quickly find the businesses that satisfy the search condition. In addition, when constructing the one or more index trees, the lower left vertexes or the upper right vertexes of the one or more circumscribed rectangles are used as the dividing points, which is beneficial to reduce the depth of the tree and further improve the search speed.

Figure 7:
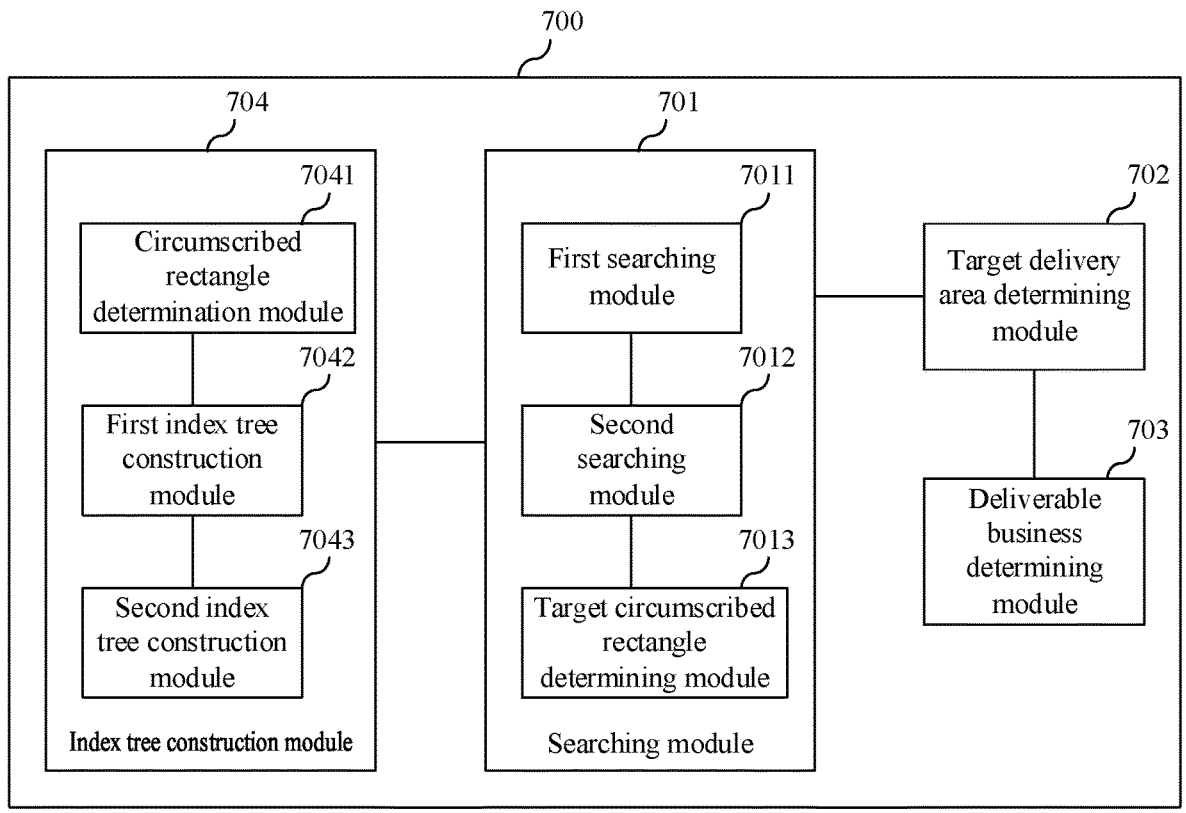
FIG. 7 is a schematic diagram of an apparatus for searching for a business according to a third embodiment of the present application.

A third embodiment of the present application relates to an apparatus for searching for a business. FIG. 7 is a schematic diagram of an apparatus for searching for a business according to a third embodiment of the present application. The apparatus 700 for searching for a business includes: a searching module 701 configured to obtain a geographic location of a user, and retrieve one or more circumscribed rectangles covering the geographic location with a pre-constructed index tree, where each of the one or more circumscribed rectangles the smallest circumscribed rectangle that covers a delivery area of a business, and the geographic location of the user and the delivery area of the business are represented by longitude and latitude information; a target delivery area determining module 702 configured to determine one or a plurality of target delivery areas in one or more delivery areas corresponding to the one or more circumscribed rectangles covering the geographic location of the user; and a deliverable business determining module 703 configured to take one or a plurality of businesses corresponding to the one or the plurality of target delivery areas as one or a plurality of deliverable businesses corresponding to the geographic location of the user.

The index tree includes a first index tree constructed based on location data of lower left vertexes of circumscribed rectangles of delivery areas of the one or more businesses in the business district and a second index tree constructed based on location data of the upper right vertexes of the circumscribed rectangles of the delivery areas of the one or more businesses.

Further, before retrieving the one or more circumscribed rectangles covering the geographic location with the pre-constructed index tree, the searching module 701 configured to determine a business district to which the user belongs based on the geographic location and the index tree corresponding to the business district.

In the embodiment of the present application, the searching module 701 includes a first searching module 7011, a second searching module 7012, and a target circumscribed rectangle determining module 7013. The first searching module 7011 is configured to search for a set of lower left vertexes each having a longitude value less than the longitude value of the geographic location of the user and a latitude value less than the latitude value of the geographic location of the user with the first index tree, to obtain a first set of circumscribed rectangles. The second searching module 7012 is configured to search for a set of upper right vertexes each having a longitude value greater than the longitude value of the geographic location of the user and a latitude value less than the latitude value of the geographic location of the user with the second index tree, to obtain a second set of circumscribed rectangles. The target circumscribed rectangle determining module 7013 is configured to determine an intersection of the first set and the second set to obtain the one or more circumscribed rectangles covering the geographic location of the user.

Further, when there are at least two circumscribed rectangles covering the geographic location of the user, the deliverable business determining module 703 adopts a parallel calculation method to determine whether the geographic location of the user is covered by a delivery area corresponding to the each of the one or more circumscribed rectangles covering the geographic location of the user, if yes, the one or more delivery areas corresponding to the one or more circumscribed rectangles are determined to be the one or the plurality of target delivery areas.

In this embodiment of the present application, the apparatus 700 for searching for a business further includes an index tree construction module 704, configured to construct one or more index trees based on the delivery areas of the one or more businesses in a business district. The index tree construction module 704 includes a circumscribed rectangle determination module 7041, a first index tree construction module 7042, and a second index tree construction module 7043.

The circumscribed rectangle determination module 7041 is configured to determine one or more circumscribed rectangles based on the delivery areas of the one or more businesses in the business district, for example, extreme values of the latitude and longitude in the delivery areas of the one or more businesses are determined, the extreme values of the latitude and longitude includes the maximum longitude, the minimum longitude, the maximum latitude, and the minimum latitude; and the one or more circumscribed rectangles based on the extreme values of the latitude and longitude are determined.

The first index tree construction module 7042 is configured to construct the first index tree based on location data of the lower left vertexes of the circumscribed rectangles of the delivery areas of the one or more businesses.

The second index tree construction module 7043 is configured to construct the second index tree based on location data of the upper right vertexes of the circumscribed rectangles of the delivery areas of the one or more businesses.

Further, the dividing points of the first index tree or the second index tree are the vertexes of the one or more circumscribed rectangles are.

Figure 8:
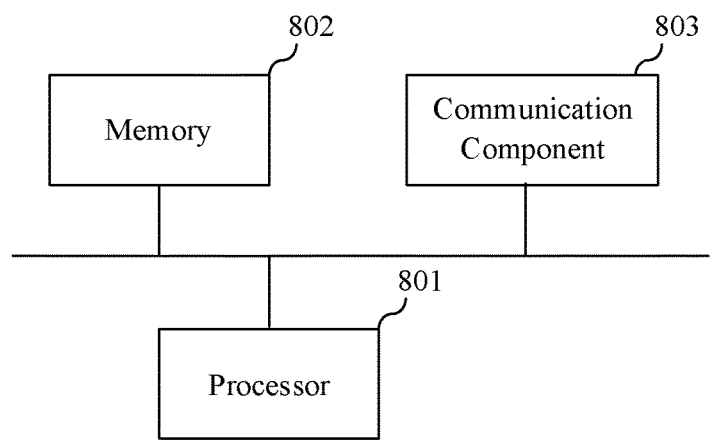
FIG. 8 is a schematic diagram of an electronic device according to a fourth embodiment of the present application.

A fourth embodiment of the present application relates to an electronic device. FIG. 8 is a schematic diagram of an electronic device according to the fourth embodiment of the present application. The electronic device includes: at least one processor 801; and a memory 802 communicatively connected with the at least one processor 801; and a communication component 803 communicatively connected with the processor 801 and the memory 802 respectively, the communication component 803 receiving and sending data under the control of the processor 801; where the memory 802 stores instructions executed by the at least one processor 801, and the instructions are executed by the at least one processor 801 to implement: obtaining a geographic location of a user, and retrieving one or more circumscribed rectangles covering the geographic location with a pre-constructed index tree, where each of the one or more circumscribed rectangles is a smallest circumscribed rectangle covering a delivery area of a business; determining one or a plurality of target delivery areas covering the geographic location from one or more delivery areas corresponding to the one or more circumscribed rectangles; determining one or a plurality of businesses corresponding to the one or the plurality of target delivery areas as one or a plurality of deliverable businesses corresponding to the geographic location; where the index tree includes a first index tree constructed based on location data of lower left vertexes of circumscribed rectangles of delivery areas of one or more businesses and a second index tree constructed based on location data of upper right vertexes of the circumscribed rectangles of the delivery areas of the one or more businesses.

The electronic device includes: one or more processors 801 and a memory 802. For example, there is one processor 801, as shown in FIG. 6. The one or more processors 801 and the memory 802 can be connected through a bus or in other ways. In FIG. 6, the connection through a bus is taken as an example. The memory 802, as a non-volatile computer-readable storage medium, can be configured to store non-volatile software programs, non-volatile computer-executable programs, and modules. The processor 801 executes various functional applications and data processing of the device by running non-volatile software programs, instructions, and modules stored in the memory 802, that is, implementing the method of searching for a business.

The memory 802 can include a storage program area and a storage data area. The storage program area can store an operating system and an application program needed by at least one function; the storage data area can store IDs of one or more businesses and the longitude and latitude information of the delivery areas of the one or more businesses. In addition, the memory 802 can include a high-speed random access memory, and can also include a non-volatile memory, such as at least one magnetic disk storage device, a flash memory device, or other non-volatile solid-state storage devices. In some embodiments, the memory 802 can optionally include one or more memories remotely provided with respect to the one or more processors 801, and these remote memories can be connected with an external device through a network. Examples of the networks include, but are not limited to, the Internet, corporate intranets, local area networks, mobile communication networks, and combinations thereof.

One or more modules are stored in the memory 802, and when executed by the one or more processors 801, the method of searching for a business in any of the foregoing method embodiments is executed.

The above-mentioned products can execute the methods provided in the embodiments of the present application, and have corresponding functional modules and beneficial effects for executing the methods. For technical details that are not described in detail in this embodiment, reference can be made to the methods provided in the embodiments of the present application.

A fifth embodiment of the present application relates to a non-volatile storage medium for storing a computer-readable program, and the computer-readable program is used for a computer to execute some or all of the above-mentioned method embodiments.

That is, those skilled in the art can understand that all or part of the steps in the method of the embodiments can be implemented by instructing relevant hardware through a program. The program is stored in a storage medium and includes several instructions to enable a device (may be a single-chip microcomputer, a chip, etc.) or a processor to executes all or part of the steps of the methods in the embodiments of the present application. The storage medium includes: a U disk, a mobile hard disk, a read-only memory (ROM), a random access memory (RAM), a magnetic disk or an optical disk and other medium that can store program codes.

A person of ordinary skill in the art can understand that the above-mentioned embodiments are specific embodiments for realizing the present application, and in actual applications, various changes can be made in form and details without departing from the spirit and scope of the present application.

The invention claimed is:

1. A method of searching for a business, comprising:
obtaining a geographic location of a user, and retrieving one or more circumscribed rectangles covering the geographic location with a pre-constructed index tree, wherein each of the one or more circumscribed rectangles is a smallest circumscribed rectangle covering a delivery area of a business;
determining one or a plurality of target delivery areas covering the geographic location from one or more delivery areas corresponding to the one or more circumscribed rectangles; and
determining one or a plurality of businesses corresponding to the one or the plurality of target delivery areas as one or a plurality of deliverable businesses corresponding to the geographic location,
wherein the pre-constructed index tree comprises a first index tree constructed based on location data of lower left vertexes of circumscribed rectangles of delivery areas of one or more businesses and a second index tree constructed based on location data of upper right vertexes of the circumscribed rectangles of the delivery areas of the one or more businesses,
wherein each node of the first index tree represents the location data of the lower left vertex of a corresponding circumscribed rectangle, and each node of the second index tree represents the location data of the upper right vertex of a corresponding circumscribed rectangle;
wherein the geographic location of the user and the delivery areas are represented by latitude and longitude coordinate;
wherein obtaining the geographic location of the user, and retrieving the one or more circumscribed rectangles covering the geographic location of the user with the pre-constructed index tree comprises:
searching for a set of lower left vertexes each having a longitude value less than the longitude value of the geographic location of the user and a latitude value less than the latitude value of the geographic location of user with the first index tree, to obtain a first set of circumscribed rectangles;
searching for a set of upper right vertexes each having a longitude value greater than the longitude value of the geographic location of the user and a latitude value less than the latitude value of the geographic location of the user with the second index tree, to obtain a second set of circumscribed rectangles; and
determining an intersection of the first set and the second set to obtain the one or more circumscribed rectangles covering the geographic location of the user.

2. The method of claim 1, wherein each of the one or more circumscribed rectangles is determined by:
determining extreme values of longitude and latitude in the delivery area of the business, wherein the extreme values of longitude and latitude comprise the maximum longitude, the minimum longitude, the maximum latitude, and the minimum latitude; and
determining the circumscribed rectangle based on the extreme values of latitude and longitude.

3. The method of claim 1, wherein before retrieving the one or more circumscribed rectangles covering the geographic location with the pre-constructed index tree, the method further comprises:

determining a business district to which the user belongs based on the geographic location and the index tree corresponding to the business district.

4. The method of claim 1, wherein in response to determining that there are at least two circumscribed rectangles covering the geographic location, determining the one or the plurality of target delivery areas covering the geographic location from the one or more delivery areas corresponding to the one or more circumscribed rectangles comprises:
adopting a parallel calculation method to determine whether the geographic location of the user is covered by a delivery area corresponding to each of the one or more circumscribed rectangles covering the geographic location of the user; and
for each circumscribed rectangle covering the geographic location of the user, in response to determining that the geographic location of the user is covered by the delivery area corresponding to the circumscribed rectangle covering the geographic location of the user, determining the delivery area corresponding to the circumscribed rectangle as a target delivery area.

5. The method of claim 1, wherein after determining the one or the plurality of businesses corresponding to the one or the plurality of target delivery areas as the one or the plurality of deliverable businesses corresponding to the geographic location, the method further comprises:
sending information on the one or the plurality of deliverable businesses to a terminal device of the user, and displaying, by the terminal device, the information on the one or the plurality of deliverable businesses.

6. The method of claim 1, wherein dividing points of the first index tree or the second index tree are the vertexes of the one or more circumscribed rectangles.

7. An electronic device, comprising:
at least one processor; and
a memory communicatively connected with the at least one processor,
wherein the memory stores instructions executable by the at least one processor, and the instructions are executed by the at least one processor to implement:
obtaining a geographic location of a user, and retrieving one or more circumscribed rectangles covering the geographic location with a pre-constructed index tree, wherein each of the one or more circumscribed rectangles is a smallest circumscribed rectangle covering a delivery area of a business;
determining one or a plurality of target delivery areas covering the geographic location from one or more delivery areas corresponding to the one or more circumscribed rectangles;
determining one or a plurality of businesses corresponding to the one or the plurality of target delivery areas as one or a plurality of deliverable businesses corresponding to the geographic location;
wherein the pre-constructed index tree comprises a first index tree constructed based on location data of lower left vertexes of circumscribed rectangles of delivery areas of one or more businesses and a second index tree constructed based on location data of upper right vertexes of the circumscribed rectangles of the delivery areas of the one or more businesses,
wherein each node of the first index tree represents the location data of the lower left vertex of a corresponding circumscribed rectangle, and each node of the second index tree represents the location data of the upper right vertex of a corresponding circumscribed rectangle;
wherein the geographic location of the user and the delivery areas are represented by latitude and longitude coordinate;
wherein when obtaining the geographic location of the user, and retrieving the one or more circumscribed rectangles covering the geographic location of the user with the pre-constructed index tree, the instructions are executed by the at least one processor to implement:
searching for a set of lower left vertexes each having a longitude value less than the longitude value of the geographic location of the user and a latitude value less than the latitude value of the geographic location of user with the first index tree, to obtain a first set of circumscribed rectangles;
searching for a set of upper right vertexes each having a longitude value greater than the longitude value of the geographic location of the user and a latitude value less than the latitude value of the geographic location of the user with the second index tree, to obtain a second set of circumscribed rectangles; and
determining an intersection of the first set and the second set to obtain the one or more circumscribed rectangles covering the geographic location of the user.

8. The electronic device of claim 7, wherein when each of the one or more circumscribed rectangles is determined, the instructions are executed by the at least one processor to implement:
determining extreme values of longitude and latitude in the delivery area of the business, wherein the extreme values of longitude and latitude comprise the maximum longitude, the minimum longitude, the maximum latitude, and the minimum latitude; and
determining the circumscribed rectangle based on the extreme values of latitude and longitude.

9. The electronic device of claim 7, wherein before searching for the one or more circumscribed rectangles covering the geographic location with the pre-constructed index tree, the instructions are executed by the at least one processor to implement:
determining a business district to which the user belongs based on the geographic location and the index tree corresponding to the business district.

10. The electronic device of claim 7, wherein in response to determining that there are at least two circumscribed rectangles covering the geographic location, when determining the one or the plurality of target delivery areas covering the geographic location from the one or more delivery areas corresponding to the one or more circumscribed rectangles, the instructions are executed by the at least one processor to implement:
adopting a parallel calculation method to determine whether the geographic location of the user is covered by a delivery area corresponding to each of the one or more circumscribed rectangles covering the geographic location of the user; and
for each circumscribed rectangle covering the geographic location of the user, in response to determining that the geographic location of the user is covered by the delivery area corresponding to the circumscribed rectangle covering the geographic location of the user, determining the delivery area corresponding to the circumscribed rectangle as a target delivery area.

11. The electronic device of claim 7, wherein after determining the one or the plurality of businesses corresponding to the one or the plurality of target delivery areas as the one or the plurality of deliverable businesses corresponding to the geographic location, the instructions are executed by the at least one processor to implement:

sending information on the one or the plurality of deliverable businesses to a terminal device of the user, and displaying, by the terminal device, the information on the one or the plurality of deliverable businesses.

12. The electronic device of claim 7, wherein dividing points of the first index tree or the second index tree are the vertexes of the one or more circumscribed rectangles.

13. A non-volatile storage medium for storing a computer readable program, wherein the computer readable program is configured to be executed by a computer to perform:

obtaining a geographic location of a user, and retrieving one or more circumscribed rectangles covering the geographic location with a pre-constructed index tree, wherein each of the one or more circumscribed rectangles is a smallest circumscribed rectangle covering a delivery area of a business;

determining one or a plurality of target delivery areas covering the geographic location from one or more delivery areas corresponding to the one or more circumscribed rectangles;

determining one or a plurality of businesses corresponding to the one or the plurality of target delivery areas as one or a plurality of deliverable businesses corresponding to the geographic location;

wherein the pre-constructed index tree comprises a first index tree constructed based on location data of lower left vertexes of circumscribed rectangles of delivery areas of one or more businesses and a second index tree constructed based on location data of upper right vertexes of the circumscribed rectangles of the delivery areas of the one or more businesses, wherein each node of the first index tree represents the location data of the lower left vertex of a corresponding circumscribed rectangle, and each node of the second index tree represents the location data of the upper right vertex of a corresponding circumscribed rectangle;

wherein the geographic location of the user and the delivery areas are represented by latitude and longitude coordinate;

wherein when obtaining the geographic location of the user, and retrieving the one or more circumscribed rectangles covering the geographic location of the user with the pre-constructed index tree, the computer readable program is configured to be executed by the computer to perform:

searching for a set of lower left vertexes each having a longitude value less than the longitude value of the geographic location of the user and a latitude value less than the latitude value of the geographic location of user with the first index tree, to obtain a first set of circumscribed rectangles;

searching for a set of upper right vertexes each having a longitude value greater than the longitude value of the geographic location of the user and a latitude value less than the latitude value of the geographic location of the user with the second index tree, to obtain a second set of circumscribed rectangles; and determining an intersection of the first set and the second set to obtain the one or more circumscribed rectangles covering the geographic location of the user.

* * * * *